(12) United States Patent
Bormann et al.

(10) Patent No.: US 7,462,041 B2
(45) Date of Patent: Dec. 9, 2008

(54) AUTOMATION SYSTEM AND METHOD FOR IDENTIFYING AND CORRECTING CONNECTION ERRORS

(75) Inventors: Ulf Bormann, Altdorf (DE); Harald Günther, Feucht (DE); Dieter Munz, Höchstadt (DE); Torsten Vogt, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/590,231

(22) PCT Filed: Feb. 15, 2005

(86) PCT No.: PCT/EP2005/050657

§ 371 (c)(1),
(2), (4) Date: Aug. 22, 2006

(87) PCT Pub. No.: WO2005/083535

PCT Pub. Date: Sep. 9, 2005

(65) Prior Publication Data

US 2007/0184684 A1    Aug. 9, 2007

(30) Foreign Application Priority Data

Mar. 1, 2004  (DE) .................. 10 2004 010 003

(51) Int. Cl.
*H01R 12/00*  (2006.01)

(52) U.S. Cl. .................................. 439/76.1
(58) Field of Classification Search ............... 439/76.1; 324/301, 300

See application file for complete search history.

(56) References Cited

U.S. PATENT DOCUMENTS

| | | | | |
|---|---|---|---|---|
| 5,221,897 A | * | 6/1993 | Duret et al. | 324/302 |
| 5,357,199 A | * | 10/1994 | Leger et al. | 324/301 |
| 5,404,103 A | * | 4/1995 | Duret | 324/301 |
| 5,455,511 A | * | 10/1995 | Duret | 324/301 |
| 5,463,318 A | * | 10/1995 | Duret | 324/301 |
| 5,613,064 A | | 3/1997 | Curtin | |
| 6,640,308 B1 | | 10/2003 | Keyghobad et al. | |
| 2003/0202301 A1 | * | 10/2003 | Jackson et al. | 361/86 |
| 2004/0124833 A1 | * | 7/2004 | Kliman et al. | 324/241 |

FOREIGN PATENT DOCUMENTS

| | | |
|---|---|---|
| DE | 41 00 634 A1 | 7/1992 |
| DE | 43 19 485 C2 | 5/1996 |
| DE | 196 47 870 A1 | 7/1997 |
| DE | 100 35 174 A1 | 12/2001 |

* cited by examiner

*Primary Examiner*—Jean F Duverne

(57) ABSTRACT

An automation system and a method for identifying and correcting connection errors of field devices that are connected to an automation system are provided. A connecting unit is used to optionally connect field device connections of an automation system with connections of a feed or measuring component of the automation system.

5 Claims, 6 Drawing Sheets

AUTOMATION SYSTEM AND METHOD FOR IDENTIFYING AND CORRECTING CONNECTION ERRORS

CROSS REFERENCE TO RELATED APPLICATIONS

This application is the US National Stage of International Application No. PCT/EP2005/050657, filed Feb. 15, 2005 and claims the benefit thereof. The International Application claims the benefits of German application No. 102004010003.9 DE filed Mar. 1, 2004, both of the applications are incorporated by reference herein in their entirety.

FIELD OF INVENTION

The invention relates to an automation system and method for identifying and correcting connection errors for field devices connected to an automation system.

BACKGROUND OF THE INVENTION

Automated production and manufacturing plants in principle comprise the plant components to be automated (production and manufacturing equipment), the automation system and the connection elements between plant and automation system. Such connection elements include sensors and actuators (field devices) and the line components required to connect them, where line components may be, for example, standard copper wires, thermocouple wires, equalizing conductors, compensation units etc. Passive, non-intelligent sensors such as thermocouples, thermistors, pressure sensors, accelerometers, resistance-type sensors, position sensors etc., and non-intelligent actuators such as valves, relays, motors etc. are often used to detect and control process variables such as temperature, pressure, valve position etc.

In order to connect a sensor or an actuator to an input/output module of the automation system, the terminals of the sensor or actuator must be connected to at least the same number of terminals of the input/output module. The lines can be classified here into excitation lines and measurement lines, where sensors usually have another m=0 excitation lines in addition to n=2 measurement lines, because many sensors need to be supplied by currents, frequencies etc. in order to show a measurable response. In addition to m=2 excitation lines for setting the control variable, an actuator has another n=0 measurement lines for monitoring the actuator response. In addition, k=0 lines for both excitation and measurement may be used with many sensors and actuators. Measurement variables and excitation variables may be current, voltage, frequencies etc. for example. FIG. 1 shows a typical design of an installation of a field device 1 to a conventional input/output module 2 of an automation system, where the field-device terminals 3 are connected to the terminals 4 of an excitation component 5 and to the terminals 6 of a measurement component 7, which are connected to a control unit 8.

Some sensors and actuators can also be operated with fewer lines by measurement and excitation being made via common lines. Dispensing with lines usually results in loss of accuracy. For example, with resistance-type sensors, the lower the number of lines used, the greater the measurement inaccuracies caused by line resistances. FIGS. 2 to 4 show typical connections of resistance-type sensors 9 having four, three and two lines. The resistance-type sensors 9 are each excited by a current; a voltage is then measured from which the resistance can be calculated. The m excitation lines 10 are shown here with dashed lines, while continuous lines are used for the n measurement lines 11 and k combined excitation/measurement lines 12.

During installation of a field device (sensor or actuator) there is always the inherent risk of an incorrect connection, with mistakes occurring more easily, the more lines that such a field device has and the more terminals the input/output module has per channel. In addition, faults such as a broken wire or short circuit can arise in the line components during operation.

Irrespective of whether errors arise as a result of incorrect installation or during operation, they usually result in incorrect or inaccurate measurements, which if not immediately identified, significantly impair the quality of the manufacturing process and products, and may lead to production rejects. Significant costs also arise in these cases to locate and repair the source of the impairment. FIGS. 5 to 7 show examples of incorrect installations of four-wire, three-wire and two-wire resistance-type sensors.

SUMMARY OF INVENTION

Today's input/output modules are capable of detecting the existence of an error and tracing it back to broken wires and short circuits from the error report. This has the disadvantage that locating a detected error to remove it requires a certain amount of skill on the part of maintenance staff.

Another disadvantage of known input/output modules is that errors that arise during installation of a field device cannot be diagnosed immediately but only once the whole automation system is put into operation. Since the errors discovered at this point must be corrected manually, increased costs arise when the maintenance staff are no longer immediately at the site of the incorrectly installed field device. If an error arises during operation, such as a broken wire or short circuit, for example, this usually results in the process shutting down with corresponding production stoppage unless redundancy is provided.

An object of the present invention is to reduce the costs involved in identifying or correcting connection errors in an automation system.

This object is achieved by an automation system according to which a fundamental idea of the invention is to connect each field-device terminal of the automation system, and hence also each terminal of the connected field device, selectively to each terminal of the measurement component or excitation component. For this purpose, a suitable connection unit is inserted between the field-device terminals of the automation system and the measurement component or excitation component.

This connection unit is preferably designed as a switch matrix. The switch matrix can be implemented using electronic, mechanical, micro- electromechanical, optical or magnetic switching elements both discretely and in integrated form.

In one embodiment of the invention, the switch matrix is controlled by a control unit. A microcontroller, a digital signal processor (DSP) or a finite state machine or the like is preferably used for this purpose. Such a control unit usually already exists in order to process, filter, linearize, evaluate etc. received measurements, so that no additional components are generally required for this. It is particularly advantageous if the switch matrix and control unit are designed as elements of an integrated circuit.

The object according to the invention is also achieved by a method according to which a fundamental idea of the invention is that to identify connection errors in field devices connected to an automation system, supplying a signal to a field device and determining a measurement variable assigned to the field device take place at freely-selectable connection combinations, which can be provided in the simplest manner by means of the connection unit.

The method preferably proceeds as follows: a signal is supplied by the excitation component to the field device; this signal contains a sensor-specific or actuator-specific electrical or other physical variable; to determine this variable, the automation system knows the type of the connected field device; the signal can be output to any field-device terminals of the automation system by means of the connection unit; the measurement component can also determine measurement variables at any field-device terminals of the automation system using the connection unit; the analysis unit can draw conclusions from the measurement variables about the external wiring i.e. the connection of the field device.

In a further embodiment, the process of supplying and determining is repeated using different connection combinations. Definite identification of how the field device is connected is achieved by the sequence of a plurality of excitations and measurements, where the sequence can either be fixed in advance or adjusted dynamically according to earlier measurements and excitations. The method can be used for excitation and measurement both at a single field-device terminal and at any number of field-device terminals.

The object according to the invention is also achieved by a method according to which a fundamental idea of the invention is that after identifying connection errors in field devices connected to an automation system, these errors are corrected by means of the connection unit. The method as claimed in claim 5 is preferably used here to identify the connection errors. In other words, the identification method according to the invention and the correction method according to the invention can preferably be used in conjunction with each other.

A connection error is taken to mean here any non-optimum connection of a field device, including damaged lines. Furthermore, correction of the connection error in the sense of the invention includes not only removing the connection error by making an optimum connection, but is also understood to mean making a connection to maintain the functionality of the field device or to minimize damage etc.

According to one embodiment of the invention, the field device is operated in a best-possible connection for the field-device type concerned by adjusting the connection unit. To do this, the connection unit is controlled by a control unit. On the basis of the identified connection, and knowing the field-device type and the components available, the control unit specifies the best possible connection for the field-device type. If it is known, for example, that the field device is a thermistor, then an investigation is made as to whether it is connected by a two-wire, three-wire of four-wire circuit. Then according to the results of the investigation, a best possible connection of the thermistor is made using the control unit, assuming this connection does not exist already. The control unit is preferably combined with the analysis unit in this case, so that the connection unit can be controlled directly according to the results of the measurement analysis. This embodiment can be used particularly in those cases where no details are known about the field-device connection.

In a further embodiment of the invention, the identified connection is compared with a known configuration, in particular with regard to field-device type, connection type, connected terminals etc. Where discrepancies exist between connection and configuration, the connection error is corrected. A more precise diagnosis using further excitations and measurements can be made prior to this in an intermediate step. In addition, the field device can be operated without loss of accuracy by changes to the connection unit to suit the existing connection, providing lines have only been swapped over compared with the configuration i.e. there are no broken wires, short-circuits etc.

According to this embodiment of the invention, the connection error can be corrected by using the connection unit to adapt the discovered circuit to suit the original configuration. Alternatively the connection error can also be corrected by changing the original configuration. In other words, the connection unit is then used to adapt the circuit to suit the discovered connection error. The original configuration is modified for this purpose, and is saved in its new version. This achieves consistency between the configuration and the actual circuit, so that maintenance staff or the like always have access to up-to-date data.

During plant startup, the automation system according to the invention or the identification and correction method according to the invention provide the advantage of automatic identification of the sensor/actuator connection. In addition, a detailed diagnosis for discrepancies between configuration and connection is possible, as are automatic correction of swapped lines and automatic operation of the sensor/actuator in the best possible operating mode.

The methods according to the invention can also be used during operation, however, to check and correct installation errors. If line faults (broken wire, short-circuit etc.) are discovered during operation, not only can a precise diagnosis be made for the maintenance staff, but in addition, the connection unit can be adapted according to the error in order to continue to operate the component in a form of emergency mode without noticeable loss of accuracy. In order to minimize this loss of accuracy, data obtained in measurements of the circuit configuration can be used. If emergency-mode operation is not possible, the maintenance staff can be provided with a precise diagnosis of the existing error. The method can also be used to check whether the error(s) have been corrected by the maintenance staff, in order to re-enable automatically normal operating mode if applicable. In other words, process shutdowns for damaged lines during operation can be minimized or completely avoided by the following advantageous features: automatic checking for damaged lines, detailed diagnosis of damaged lines, for many damaged lines operation in emergency mode without noticeable loss of accuracy, automatic re-enabling of normal operating mode when error removed by maintenance staff.

Self-maintaining automation systems are made possible by the automation system according to the invention or the identification and correction method according to the invention. It is also particularly advantageous to use the invention in automation systems having passive, non-intelligent actuators and sensors. Errors that arise can be removed automatically without external intervention and hence extremely cheaply, thereby reducing significantly the maintenance costs of automation systems.

BRIEF DESCRIPTION OF THE DRAWINGS

The present invention is described below with reference to an exemplary embodiment, which is explained in greater detail by means of drawings, in which FIG. 16 shows an installation of a sensor/actuator on an alternative connection unit where differential signals are dispensed with.

DETAILED DESCRIPTION OF INVENTION

An automation system according to one embodiment of the invention comprises a central processing unit (CPU) and a number of modules connected to the central processing unit via a bus system, one of said modules being an input/output module 13 for connecting the automation system to a production plant. An analog input/output module for connecting actuators and sensors acts here as the input/output module 13.

Figure 1:
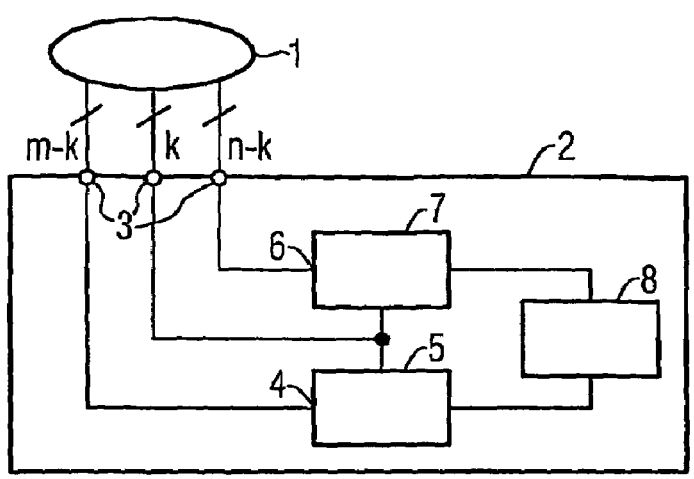
FIG. 1 shows a prior are design of an installation of a field device to a conventional input/output module of an automation system.
Figure 2:
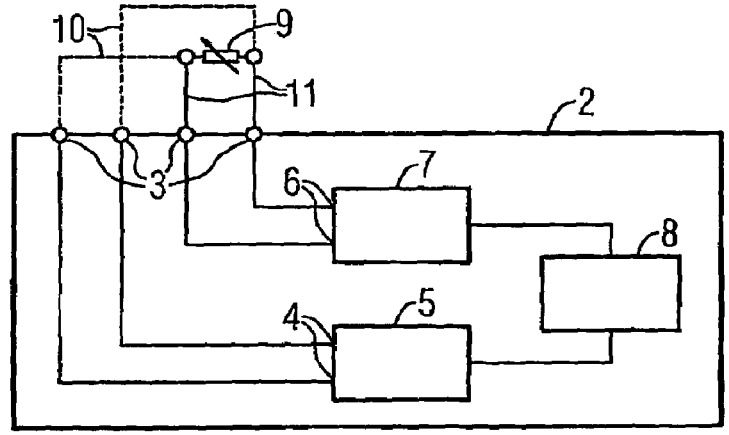
FIG. 2 shows an embodiment of a prior art typical connections of a resistance-type sensor having 4 lines.
Figure 3:
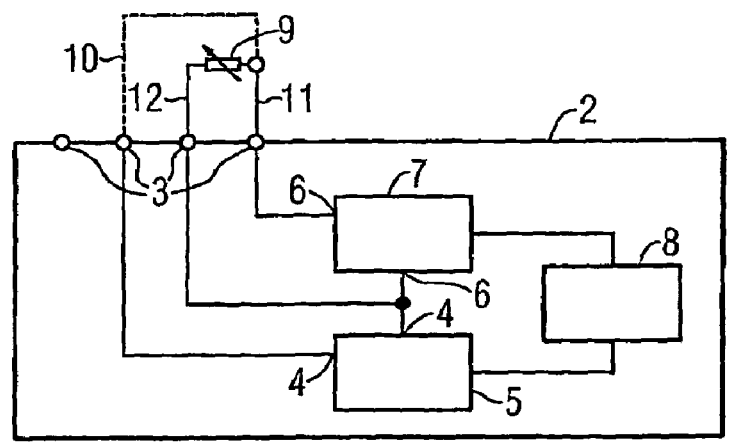
FIG. 3 shows an embodiment of a prior art typical connections of a resistance-type sensor having 3 lines.
Figure 4:
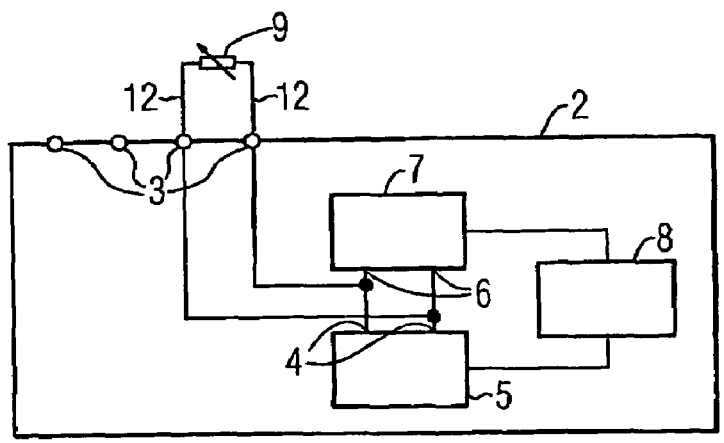
FIG. 4 shows an embodiment of a prior art typical connections of a resistance-type sensors having 2 lines.
Figure 5:
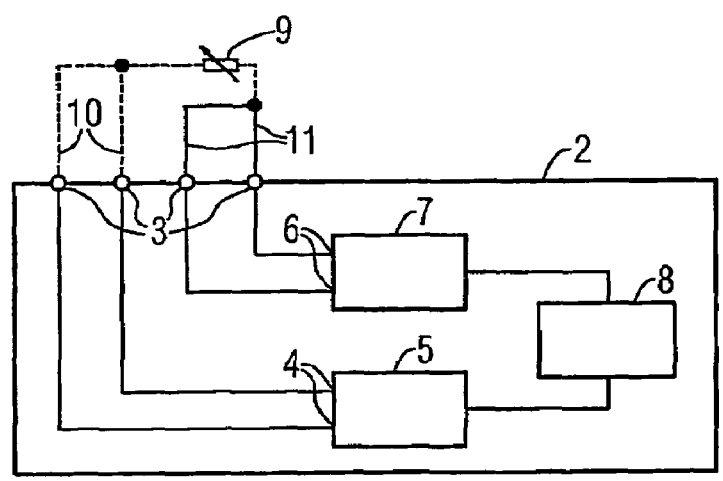
FIG. 5 shows an embodiment of an incorrect installations of a four-wire resistance-type sensor.
Figure 6:
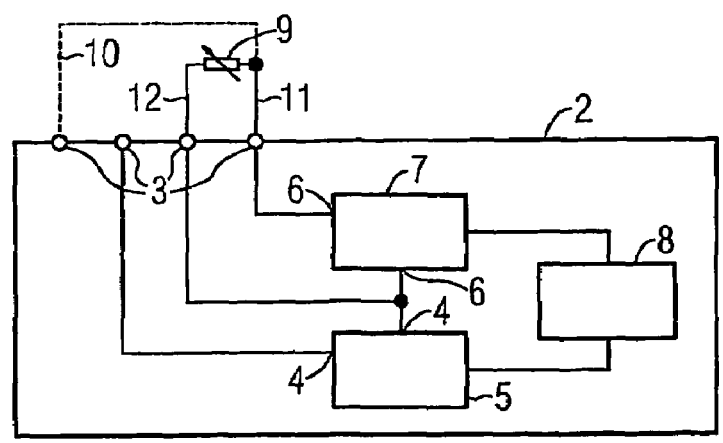
FIG. 6 shows an embodiment of an incorrect installation of a three-wire resistance-type sensor.
Figure 7:
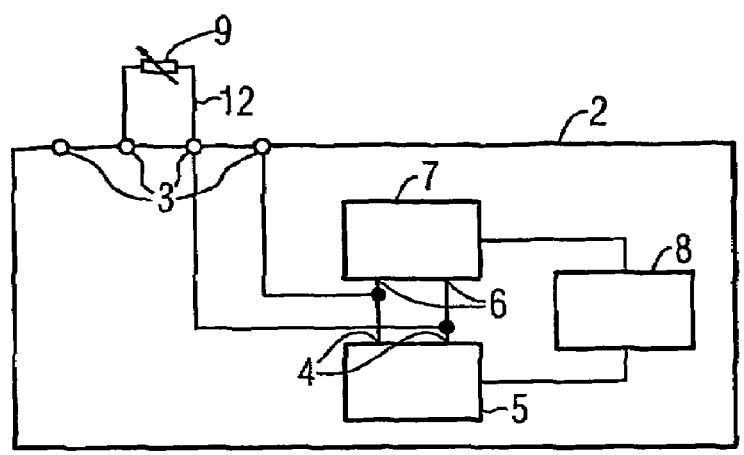
FIG. 7 shows an embodiment of an incorrect installations of a two-wire resistance-type sensor.
Figure 8:
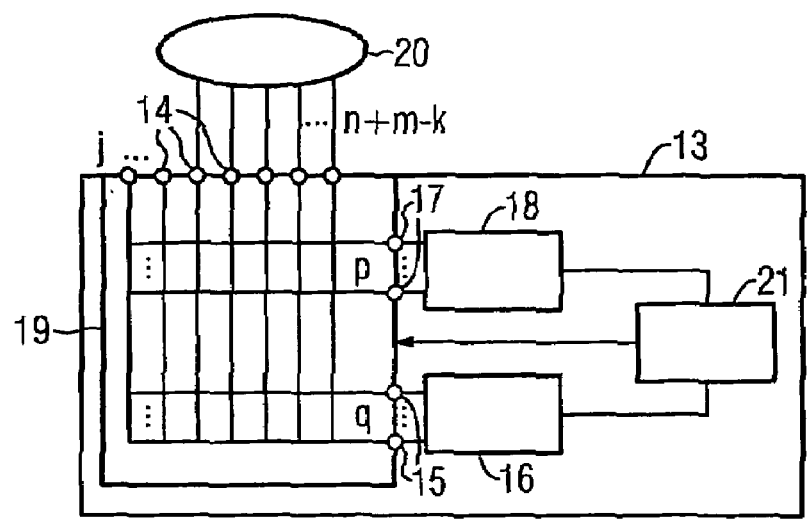
FIG. 8 shows an installation of a sensor/actuator on a switch matrix of an input/output module.

As shown schematically in FIG. 8, according to one embodiment of the invention, in the input/output module 13 of the automation system, a switch matrix 19 is inserted between the field-device terminals 14 of the input/output module 13 on the one side, and the q>0 terminals 15 of an electronic excitation circuit 16 plus the p>0 terminals 17 of an electronic measurement circuit 18 on the other side. The sensor 20 connected to the field-device terminals 13 is connected to n+m+k terminals here. The j≧0 terminals of the input/output module 13 not connected to the sensor 20 remain unused. In a further embodiment of the invention, an actuator can also be connected instead of the sensor 20.

The switch matrix 19 is connected to an analysis and control unit 21, which is used to control the switch matrix 19. The analysis and control unit 21 is also connected to both the electronic excitation circuit 16 and the electronic measurement circuit 18, being used not only to control the electronic excitation circuit 16 but also to analyze the measurement results received from the electronic measurement circuit 18. A digital signal processor is used as the analysis and control unit 21. The analysis and control unit 21 is connected via a communications module to the central processing unit of the automation system (not shown). Conditioning, linearization and scaling of sensor signals etc. amongst other functions are performed in the input/output module 13, and the sensor signals are then relayed to the central processing unit. Relevant control routines are executed in the central processing unit, at the end of which, control data is returned to the analysis and control unit 21. Finally, based on the returned control data, the process is selectively controlled by the analysis and control unit 21. The data required to correct an identified connection error, for instance data on the field-device type or configuration, is saved in a non-volatile memory (not shown) of the input/output module 13, which can be accessed by the analysis and control unit 21.

The electronic excitation circuit 16 comprises a current source or voltage source, which is controlled from the analysis and control unit 21. A digital-to-analog converter having an amplifier at its output is used for this purpose, which outputs the current or voltage corresponding to a given signal value. The electronic measurement circuit 18 comprises an analog instrumentation amplifier and an analog-to-digital converter for converting the signals provided for the analysis and control unit 21.

In one embodiment of the invention, the switch matrix 19, which is only shown schematically, is implemented jointly with the electronic excitation circuit 16, the electronic measurement circuit 18 and the analysis and control unit 21 on a single integrated circuit. A discrete design of the switch matrix using transistors or analog circuits is also possible as an alternative to this. The important point is that the switch matrix can be switched automatically i.e. without manual actuation.

Figure 9:
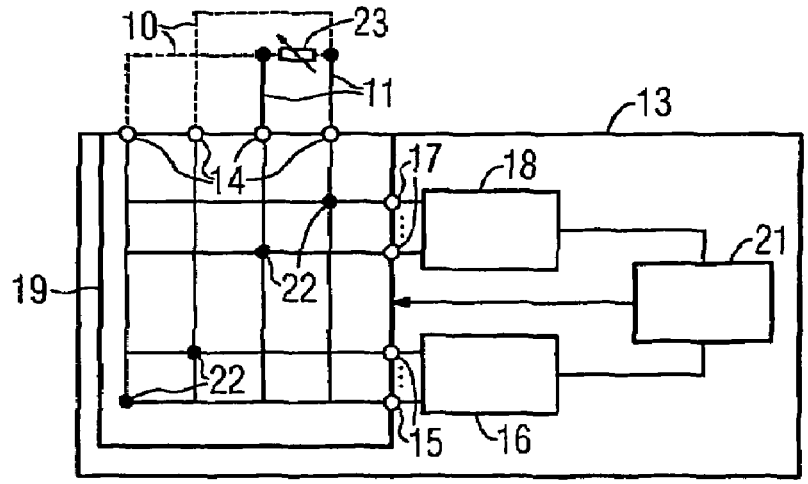
FIG. 9 shows an installation of a four-wire resistance-type sensor on a switch matrix of an input/output module.
Figure 10:
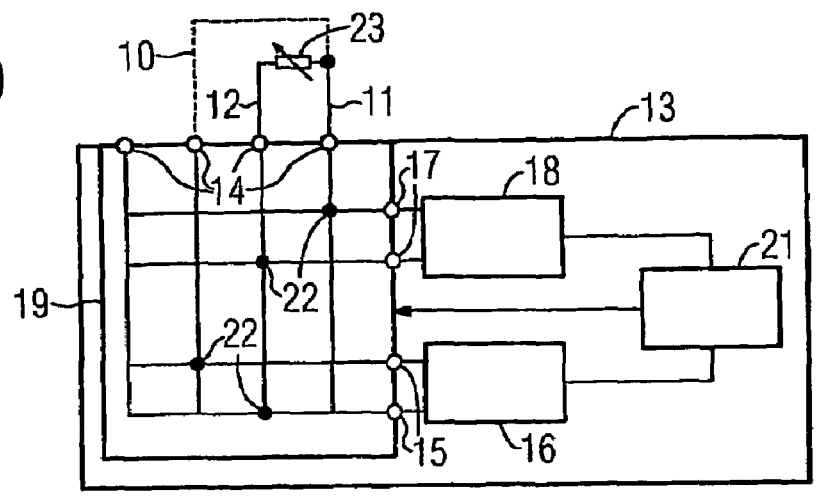
FIG. 10 shows an installation of a three-wire resistance-type sensor on a switch matrix of an input/output module.
Figure 11:
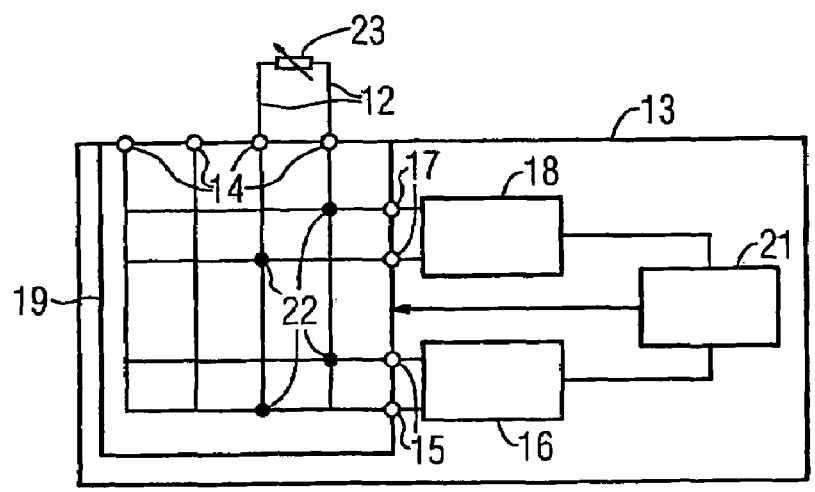
FIG. 11 shows an installation of a two-wire resistance-type sensor on a switch matrix of an input/output module.

FIGS. 9 to 11 show by way of example the settings of a switch matrix 19 according to the invention for correctly connected four-wire, three-wire and two-wire resistance-type sensors, where the matrix nodes 22 making a connection are highlighted in the diagram. By excitation and measurement at different combinations of terminals 14 of the resistance-type sensor 23, where the switch matrix 19 enable such combinations to be implemented in a simple manner, excitation lines and measurement lines can be identified and the line resistances measured, for example.

Figure 12:
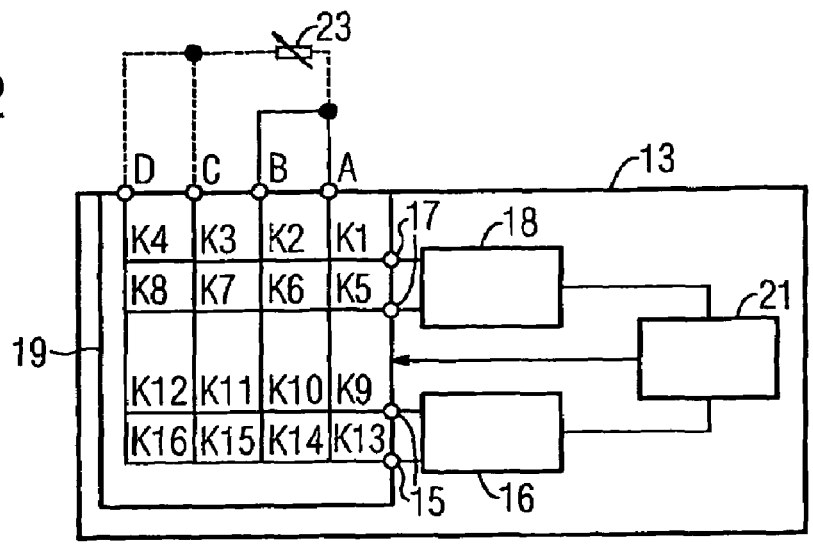
FIG. 12 shows an identification of an incorrect installation of a four-wire resistance-type sensor.
Figure 13:
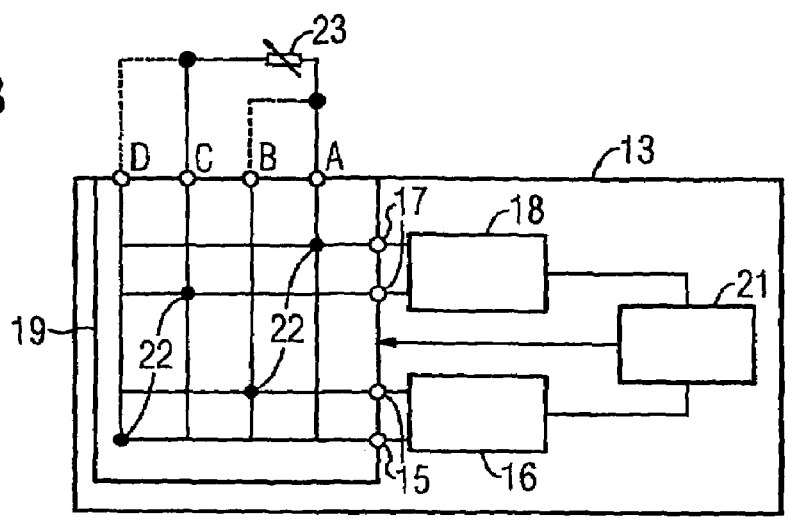
FIG. 13 shows a correction of the incorrect connection shown in FIG. 12.

FIGS. 12 and 13 illustrate correction of installation errors of resistance-type sensors 23 as an example application of the invention.

FIG. 12 shows an incorrectly connected resistance-type sensor 23. In order to identify the circuit configuration, the resistance between the terminals A and B is measured first. To do this, the switches K9 and K14 are closed, and a current is injected between A and B by the electronic excitation circuit 16. The switches K1 and K6 are also closed. The voltage between the terminals A and B is measured by the electronic measurement circuit 18. The analysis and control unit 21 calculates the resistance between the terminals A and B from the result of the voltage measurement and the magnitude of the injected current. Then the resistance between the terminals A and C (K1, K7, K9 and K15 closed) is found, and the resistance between the terminals A and D (K1, K8, K9 and K16 closed) and the resistance between the terminals C and D (K3, K8, K11 and K16 closed). Since in the given circuit configuration the resistances between the terminals A and B and the terminals C and D respectively are far lower than the approximately identical resistances between the terminals A and C and A and D respectively, it is possible to conclude definitely the currently incorrect connection.

This incorrect connection is corrected automatically by the setting of the switch matrix 19 shown in FIG. 13 without loss of accuracy and without using maintenance staff, with the switch matrix 19 receiving the relevant control instructions from the analysis and control unit 21.

Figure 14:
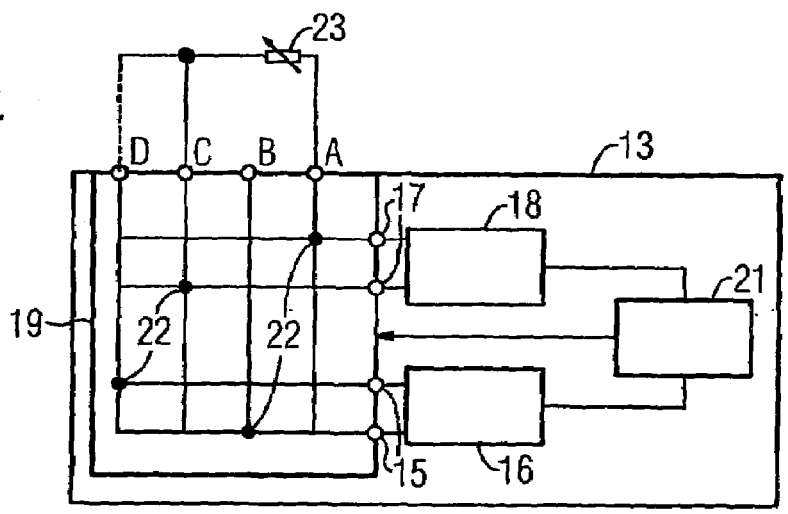
FIG. 14 shows operation in emergency mode following a broken wire in the connection shown in FIG. 13.
Figure 15:
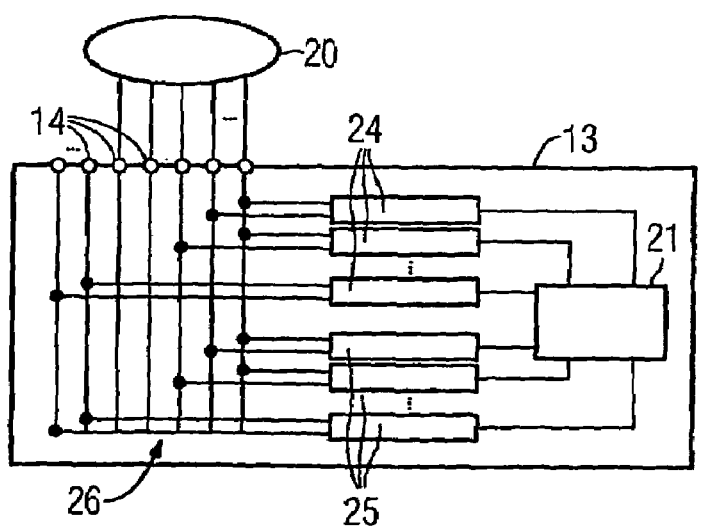
FIG. 15 shows an installation of a sensor/actuator on an alternative connection unit.

The correction of broken wires to resistance-type sensors 23 is illustrated in FIGS. 14 and 15 as a further example application of the invention.

If a movement, for example arising from a trailing cable or a movable sensor interface or the like, results in a break in an excitation line 10, then the sensor 20 is no longer operational. By using the invention it is now no longer necessary to shut down the production plant, replace the sensor 20 and then re-start the production plant. Instead, the connection is corrected internally by means of the switch matrix 19, for example by using one of the measurement lines 11 as an excitation line 10. This ensures continued operation of the sensor 20 without shutting down the production plant.

If a broken wire occurs at terminal B, for example, in the incorrect connection shown in FIG. 13, the error can be definitely identified by the same resistance measurements as in the previous example. The resistance-type sensor 23 can be operated as a three-wire resistance-type sensor by the setting of the switch matrix 19 shown in FIG. 14. Measurement inaccuracies result from the line resistance between terminal A and the resistance-type sensor 23. Since this resistance can always be measured approximately, however, the measurement inaccuracies can be compensated for in the subsequent measurement conditioning.

For connection errors or broken wires other than in the exemplary embodiments just described, the sequence and nature of additional measurements must be adjusted according to the first resistance measurements(s).

Figure 16:
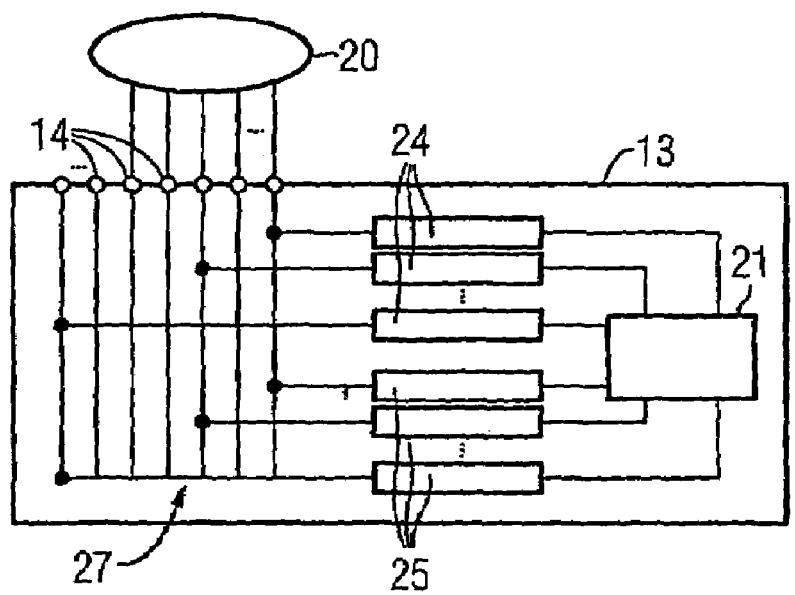

In a further embodiment of the invention, an implicit connection unit is used instead of an explicit switch matrix, which is implemented by duplicating the measurement and excitation lines 10, 11 and the corresponding measurement and excitation components 24, 25. Such a connection unit 26 is shown in FIG. 15. It is preferably used when only a small number of excitation and measurement lines 10, 11 are required. In this case, measurement and excitation are provided for all the j*(j+1)/2 combinations of the j terminals of the input/output module 13. Depending on the sensor type or actuator type, not all combinations of measurement and excitation are necessary, however, to identify the connection and to correct automatically connection errors and damaged lines. If differential signals are dispensed with, only a maximum of j excitations and j measurements still need to exist. Such a connection unit 27 is shown in FIG. 16.

The invention claimed is:

1. A method for identifying connection errors in a field device connected to an automation system, comprising:
   supplying a signal to the field device via an excitation component, wherein the field device is selected from the group consisting of a sensor and an actuator;
   determining a measurement variable assigned to the field device via a measurement component;
   analyzing the measurement variable via an analysis unit;
   selecting connection combinations for a plurality of connectors of the field device, at least of a portion of the connectors connected each connected to and a terminal selected from the group consisting of a terminal of the excitation component and a terminal of the measurement component; and
   repeating the process of supplying, determining and selecting,
   wherein a subsequent selecting uses a different connection combinations,
   and further wherein the repetition or the selection of the used terminals depends on the result of the analysis of an earlier measurement,
   wherein the connection unit is controlled by a control unit, wherein the connection unit is a switch matrix, wherein the control unit and the switch matrix are elements of an integrated circuit.

2. The method as claimed in claim 1, wherein each field-device terminal of the automation system is selectively connectable to each terminal of the measurement component or excitation component.

3. A method for correcting connection errors in a field device connected to an automation system, comprising:
   providing an excitation component that supplies a signal to the field device;
   providing a measurement component that determines a measurement variable assigned;
   identifying a connection error;
   correcting the connection error via a connection unit that selectively connects field-device connectors and terminals, each terminal selected from the group consisting of a terminal of the excitation component and a terminal of the measurement component; and
   controlling the connection unit with a control unit, wherein the connection unit is a switch matrix, wherein the control unit and the switch matrix are elements of an integrated circuit.

4. The method as claimed in claim 3, wherein correction of the connection error includes adapting the connection unit to suit the field-device type.

5. The method as claimed in claim 4, wherein correcting the connection error comprises comparing with a known configuration between the field device and the automation system and appropriate adjustment of the connection unit.

* * * * *